(12) United States Patent
Uchida

(10) Patent No.: US 9,744,732 B2
(45) Date of Patent: Aug. 29, 2017

(54) ELECTROPHOTOGRAPHIC ENDLESS BELT, METHOD FOR PRODUCING THE SAME, AND ELECTROPHOTOGRAPHIC APPARATUS

(71) Applicant: CANON KABUSHIKI KAISHA, Tokyo (JP)

(72) Inventor: Kouichi Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 14/879,073

(22) Filed: Oct. 8, 2015

(65) Prior Publication Data
US 2016/0031171 A1    Feb. 4, 2016

Related U.S. Application Data

(60) Division of application No. 14/217,196, filed on Mar. 17, 2014, now abandoned, which is a continuation of
(Continued)

(30) Foreign Application Priority Data

Oct. 26, 2012    (JP) ................. 2012-236650

(51) Int. Cl.
| | | |
|---|---|---|
| B23D 29/00 | (2006.01) | |
| B29D 29/00 | (2006.01) | |
| G03G 15/16 | (2006.01) | |
| G03G 15/01 | (2006.01) | |
| B29C 35/08 | (2006.01) | |
| B29K 101/12 | (2006.01) | |
| B29K 105/00 | (2006.01) | |
| B29L 9/00 | (2006.01) | |
| B29L 31/00 | (2006.01) | |

(52) U.S. Cl.
CPC .......... B29D 29/00 (2013.01); B29C 35/0805 (2013.01); G03G 15/0173 (2013.01);
(Continued)

(58) Field of Classification Search
None
See application file for complete search history.

(56) References Cited

U.S. PATENT DOCUMENTS 6,336,025 B1    1/2002  Saeki
9,017,591 B2 *  4/2015  Uchida ................ B29C 49/22
                                                              264/447
(Continued)

FOREIGN PATENT DOCUMENTS

JP    8-175007 A    7/1996
JP    2001-166608 A  6/2001
(Continued)

OTHER PUBLICATIONS

International Search Report dated Jan. 21, 2014 in International Application No. PCT/JP2013/006126.
(Continued)

*Primary Examiner* — Monica Huson
(74) *Attorney, Agent, or Firm* — Fitzpatrick Cella Harper and Scinto

(57) ABSTRACT

A high-quality electrophotographic endless belt and a method capable of efficiently producing the belt are provided. A method for producing an electrophotographic endless belt comprising a base layer including a thermoplastic resin composition and an inner-surface layer, which includes: (1) forming an energy curable film having a glass transition temperature on an inner surface of a test tube-shaped preform including a thermoplastic resin and then subjecting the preform to blow molding to obtain a blow-molded bottle; (2) irradiating the blow-molded bottle with energy rays to cure the film to form an inner-surface layer; and (3) cutting out an endless belt from the blow-molded bottle having the inner-surface layer obtained in (2).

3 Claims, 2 Drawing Sheets

Related U.S. Application Data application No. PCT/JP2013/006126, filed on Oct. 15, 2013.

(52) U.S. Cl.
CPC ....... *G03G 15/162* (2013.01); *G03G 15/1605* (2013.01); *B29C 2035/0827* (2013.01); *B29K 2101/12* (2013.01); *B29K 2105/258* (2013.01); *B29L 2009/00* (2013.01); *B29L 2031/767* (2013.01); *Y10T 428/31504* (2015.04)

(56) References Cited

U.S. PATENT DOCUMENTS

| | | |
|---|---|---|
| 2005/0084680 A1 | 4/2005 | Denes et al. |
| 2007/0122211 A1 | 5/2007 | Maekawa |
| 2011/0188901 A1 | 8/2011 | Pietrantoni et al. |
| 2011/0249995 A1 | 10/2011 | Uchida et al. |
| 2013/0195519 A1 | 8/2013 | Ito et al. |
| 2014/0301759 A1 | 10/2014 | Uchida |

FOREIGN PATENT DOCUMENTS

| | | |
|---|---|---|
| JP | 2006-267240 A | 10/2006 |
| JP | 2007-171746 A | 7/2007 |
| JP | 2007-178750 A | 7/2007 |
| JP | 2008-40139 A | 2/2008 |
| JP | 2012-137733 A | 7/2012 |

OTHER PUBLICATIONS

International Preliminary Report on Patentability, International Application No. PCT/JP2013/006126, Mailing Date May 7, 2015.

\* cited by examiner

ELECTROPHOTOGRAPHIC ENDLESS BELT, METHOD FOR PRODUCING THE SAME, AND ELECTROPHOTOGRAPHIC APPARATUS

CROSS-REFERENCE TO RELATED APPLICATIONS

This application is a divisional of application Ser. No. 14/217,196, filed Mar. 17, 2014, which is a continuation of International Application No. PCT/JP2013/006126, filed Oct. 15, 2013, which claims the benefit of Japanese Patent Application No. 2012-236650, filed Oct. 26, 2012.

BACKGROUND OF THE INVENTION

Field of the Invention

The present invention relates to an electrophotographic endless belt used for an electrophotographic apparatus, a method for producing the same, and an electrophotographic apparatus.

Description of the Related Art

The endless belt used as an intermediate transfer belt or the like in an electrophotographic apparatus is stretched between a plurality of rollers and rotated. At this time, the inner circumferential surface of the endless belt may be scratched when fine foreign matter is caught between the endless belt and the surface of the rollers stretching the endless belt. In the case where the endless belt is used, for example, as an intermediate transfer belt, such a scratch may cause transfer unevenness when applying transfer bias between an electrophotographic photosensitive member and the intermediate transfer belt to transfer a toner image from the electrophotographic photosensitive member to the intermediate transfer belt, and as a result, the scratch may cause streak-like unevenness in an electrophotographic image.

In order to cope with such a problem, Japanese Patent Application Laid-Open No. 2007-178750 discloses a belt for an image forming apparatus, in which the belt is an endless belt made from a thermoplastic resin composition; a layer made from a cured resin composition having higher hardness than the thermoplastic resin composition is formed, on the inner circumferential surface of the endless belt, in a thickness of 0.5 µm or more and 5.0 µm or less; and the arithmetic average roughness Ra of the inner circumferential surface of the layer is set to 0.10 µm or less.

Japanese Patent Application Laid-Open No. 2007-178750 further discloses a method of forming a hard-coat layer on the inner surface of the belt which has the steps of spray-coating an ultraviolet curable acrylic resin on an electrophotographic belt substrate obtained by extrusion and including a polyvinylidene fluoride resin and an ion conducting agent, and curing the ultraviolet curable acrylic resin.

SUMMARY OF THE INVENTION

The present inventor has repeated studies on the method for producing the belt for an image forming apparatus described in the above Japanese Patent Application Laid-Open No. 2007-178750. As a result, the method described in Japanese Patent Application Laid-Open No. 2007-178750 having a spraying step had a problem in terms of material cost due to the low application efficiency.

Therefore, the present invention is directed to providing a method for producing an electrophotographic endless belt capable of producing an electrophotographic endless belt in which scratches hardly occur on the back side thereof at a low cost.

Further, the present invention is directed to providing an electrophotographic endless belt in which scratches hardly occur on the back side thereof and which contributes to the formation of a high-quality electrophotographic image. Furthermore, the present invention is directed to providing an electrophotographic apparatus which contributes to the stable formation of a high-quality electrophotographic image.

According to one aspect of the present invention, there is provided a process for producing an electrophotographic endless belt comprising a base layer including a thermoplastic resin composition, and an inner-surface layer, the process including the steps of:

(1) forming an energy curable film having a glass transition temperature on an inner surface of a test tube-shaped preform including a thermoplastic resin and then subjecting the preform to blow molding to obtain a blow-molded bottle;

(2) irradiating the blow-molded bottle with energy rays to cure the film to form an inner-surface layer; and (3) cutting out an endless belt from the blow-molded bottle having the inner-surface layer obtained in the step (2).

According to another aspect of the present invention, there is provided an electrophotographic endless belt having a base layer including a thermoplastic resin composition, and an inner-surface layer formed on the inner circumferential surface side of the base layer, wherein the inner-surface layer includes a cured film of the energy curable film having a glass transition temperature.

According to further aspect of the present invention, there is provided an electrophotographic apparatus provided with the electrophotographic endless belt.

According to the present invention, an electrophotographic endless belt in which scratches hardly occur on the back side thereof can be produced at a low cost.

According to the present invention, an electrophotographic endless belt which can provide a high-quality electrophotographic image can also be obtained. According to the present invention, an electrophotographic apparatus which contributes to the stable formation of a high-quality electrophotographic image can also be obtained.

Further features of the present invention will become apparent from the following description of exemplary embodiments with reference to the attached drawings.

DESCRIPTION OF THE EMBODIMENTS

Figure 1:
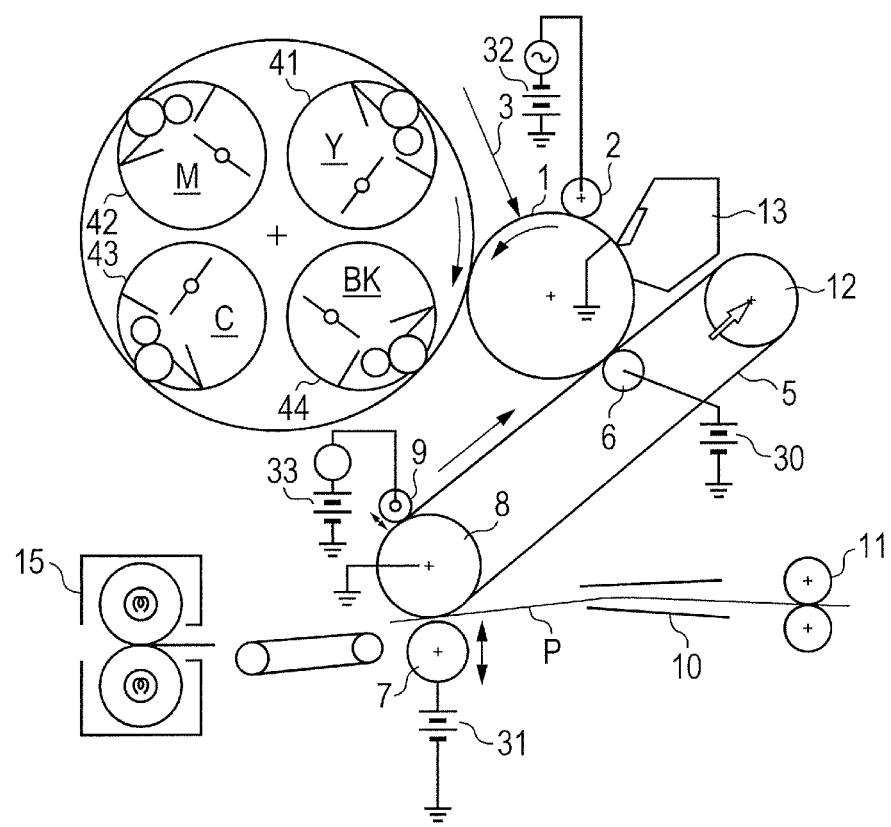
FIG. 1 is an explanatory view of an electrophotographic apparatus according to the present invention.

Hereinafter, suitable embodiments of the present invention will be described in detail.

In view of the objects described above, the present inventor studied a method for more efficiently producing an electrophotographic endless belt provided with an inner-surface layer having a uniform film thickness. In its process, the present inventor studied the application of an uncured energy curable resin to the inner surface of a preform followed by blow molding.

As a result, since the uncured energy curable resin is generally a liquid including a monomer or an oligomer, the uncured energy curable resin sometimes adhered to a stretching rod or a preform holding member during blow molding.

Therefore, the curing of an energy curable resin applied to the inner surface of a preform followed by blow molding was attempted. However, when the curing by polymerization is insufficient, the uncured energy curable resin still sometimes adhered to a stretching rod and a preform holding member. On the other hand, when the energy curable resin is completely cured to form a cured film on the inner surface of a preform, the cured film sometimes could not conform to the expansion of the preform by blow molding to cause a crack in the cured film.

For this reason, the recognition was obtained that a new production process is required in order to efficiently and stably produce the electrophotographic endless belt having an inner-surface layer.

Therefore, the present inventor studied a process including: forming an energy curable film having a glass transition temperature on the inner surface of a preform; subjecting the preform to blow molding to form a blow-molded bottle; and then curing the film. As a result, it was found that, according to this method, an electrophotographic endless belt having an inner-surface layer can be produced without contaminating a stretching rod and a preform holding member.

<Thermoplastic Resin Composition>

Any combination of materials can be suitably used as the thermoplastic resin composition for the base layer as long as blow molding from a test tube-shaped preform thereof is possible. All the thermoplastic resins, particularly, such as polypropylene (PP), polyethylene (PE), polyamide (PA), polylactic acid (PLLA), polyethylene terephthalate (PET), polyethylene naphthalate (PEN), polyphenylene sulfide (PPS), and fluororesin (such as PVdF), and a blended resin thereof are suitable for use as the thermoplastic resin which is the main component. Examples of other components constituting the thermoplastic resin composition include an ion conducting agent (for example, a polymeric ion conducting agent and a surfactant), a conductive polymer, an antioxidant (for example, a hindered phenol-based, a phosphorus-based, and a sulfur-based antioxidant), an ultraviolet absorber, an organic pigment, an inorganic pigment, a pH adjuster, a crosslinking agent, a compatibilizer, a release agent (for example, a silicone-based and a fluorine-based release agent), a crosslinking agent, a coupling agent, a lubricant, an insulating filler (for example, zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fiber, alumina fiber, potassium titanate fiber, and fine particles of a thermosetting resin), a conductive filler (for example, carbon black, carbon fiber, conductive titanium oxide, conductive tin oxide, and conductive mica), and an ionic liquid. These can be used singly or in combination of two or more.

<Energy Curable Film>

The energy curable film to be formed on the inner surface of a preform according to the present invention needs to have a glass transition temperature. That is, since the energy curable film having a glass transition temperature is in a state of increased resinification even before crosslinking, the film does not easily contaminate a stretching rod when the film is brought into contact with the stretching rod.

As a method of forming such a film on the inner surface of a preform, a method in which a resin solution including an energy curable resin having a glass transition temperature and a solvent is applied and then the solvent is volatilized to form a film is generally used.

If the energy curable resin does not have a glass transition temperature, the energy curable resin is present as a liquid and cannot form a film even if the solvent is volatilized from the resin solution. For this reason, the energy curable resin may adhere to a stretching rod and a preform holding member during blow molding.

It can be confirmed whether the energy curable film has a glass transition temperature by the observation of a peak due to the viscoelasticity (rheology) characteristics of a film or the presence or absence of the inflection point in a DSC curve obtained by the DSC (differential scanning calorimetry) measurement.

Examples of the energy to cure the energy curable resin include light, radiation, and heat. The energy is not particularly limited as long as the energy is an active radiation capable of imparting energy which can generate polymerization initiation species to the energy curable resin, and the energy includes α-rays, γ-rays, X-rays, ultraviolet rays (UV), visible light, and electron beams. Among them, ultraviolet rays and electron beams, particularly ultraviolet rays, are desirable in view of cure sensitivity and availability of an apparatus.

The energy curable resin to be used needs to have physical properties that can form a film having a glass transition temperature. Generally, it can be determined to some extent by the molecular weight of the above resin whether the resin has a glass transition temperature or not.

The energy curable resin to be used needs to be dissolved in a solvent, and a suitable solvent can be an organic solvent in view of volatility, and desirable examples include methyl ethyl ketone, toluene, and methyl isobutyl ketone. These can be used singly or in combination of two or more. The mass ratio of the energy curable resin to the organic solvent is not particularly limited as long as a film is uniformly formed on a preform, but the mass ratio of the energy curable resin to the organic solvent can be 3:97 to 90:10.

It is suitable that the energy curable resin to be used have a polymerizable functional group such as an acrylic group, a vinyl group, and an epoxy group. Among the energy curable resins, an ultraviolet curable acrylic resin is desirable in terms of the simplicity of a curing apparatus or the like. These can be used singly or in combination of two or more.

That is, as described above, the resin used for the formation of the film according to the present invention needs to have a polymerizable functional group such as an acrylic group, a vinyl group, and an epoxy group, to have a solubility in a solvent which does not dissolve a preform, and to have a glass transition temperature.

Further, the film having a glass transition temperature according to the present invention needs to be present as a film without causing a crack also on the surface of a blow-molded bottle formed by subjecting a preform to blow molding. That is, the film needs to have a flexibility to sufficiently conform to the expansion of the preform by blow molding.

In order to give such flexibility to the film, it is desirable to suitably select the weight average molecular weight of the resin having a glass transition temperature which is used for the formation of the film.

For example, in the case where a preform is subjected to blow molding to form a blow-molded bottle having 4.5 times as large outer diameter as the preform, examples of resins usable for the formation of the film having a glass transition temperature to be formed on the inner surface of the preform include "UNIDIC RC29-129" (trade name, manufactured by DIC Corporation, weight average molecular weight=30000) and "Acrit KX-012C" (trade name, manufactured by Taisei Fine Chemical Co., Ltd., weight average molecular weight=25000).

Then, in the case where the ratio of the outer diameter of a blow-molded bottle to the outer diameter of a preform is even larger, the weight average molecular weight of a resin can be adjusted to a low weight in order to impart, to the film, sufficient conformability to the expansion of the preform in blow molding, within the limitation of having a polymerizable functional group such as an acrylic group, a vinyl group, and an epoxy group, having a solubility in a solvent which does not dissolve a preform, and having a glass transition temperature.

A film of an energy curable resin may contain various additives as components besides the energy curable resin, and examples thereof include a polymerization initiator, an ion conducting agent (for example, a polymeric ion conducting agent and a surfactant), a conductive polymer, an antioxidant (for example, a hindered phenol-based, a phosphorus-based, and a sulfur-based antioxidant), an ultraviolet absorber, an organic pigment, an inorganic pigment, a pH adjuster, a crosslinking agent, a compatibilizer, a release agent (for example, a silicone-based and a fluorine-based release agent), a crosslinking agent, a coupling agent, a lubricant, an insulating filler (for example, zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fiber, alumina fiber, potassium titanate fiber, and fine particles of a thermosetting resin), a conductive filler (for example, carbon black, carbon fiber, conductive titanium oxide, conductive tin oxide, conductive mica, and zinc antimonate), and an ionic liquid. These can be used singly or in combination of two or more.

<Method for Producing Electrophotographic Endless Belt>

The method for producing an electrophotographic endless belt according to the present invention includes three steps.

Specifically, the production method includes:
(1) forming an energy curable film having a glass transition temperature on an inner surface of a test tube-shaped preform including a thermoplastic resin and then subjecting the preform to blow molding to obtain a blow-molded bottle;
(2) irradiating the blow-molded bottle with energy rays to cure the film to form an inner-surface layer; and
(3) cutting out an endless belt from the blow-molded bottle having the inner-surface layer obtained in (2).

A test tube-shaped preform including a thermoplastic resin is generally prepared by injection molding, and needs to have an amorphous state to such a degree that allows biaxial stretching to be described below. Such a preform can be obtained by controlling the mold temperature when a thermoplastic resin composition is put in a preform-shaped mold and subjected to injection-molding to produce the preform.

Specifically, mold temperature is set to a temperature sufficiently lower than the glass transition temperature of the thermoplastic resin composition, and the thermoplastic resin composition is rapidly cooled in a mold. In view of obtaining a preform in an amorphous state to such a degree that allows biaxial stretching, the cylinder temperature during injection molding can be set to a temperature higher by about 20 to 50° C. than the melting point of the thermoplastic resin composition, and the mold temperature can be set to a temperature lower by about 20 to 100° C. than the glass transition temperature of the thermoplastic resin composition.

Next, a method for forming an energy curable film having a glass transition temperature will be described. Commonly, a solution of an energy curable resin having a glass transition temperature dissolved in an organic solvent or the like is applied to the inner surface of a preform according to a known method and then allowed to stand in a thermostatic chamber or the like to volatilize the organic solvent. Examples of the application method to the inner surface of the preform include spray coating and dip coating, but the dip coating is desirable in terms of simplicity.

The blow molding method using a preform having the energy curable film as described above formed on the inner surface will be described below.

Blow molding by a cold parison process is desirable in terms of applying a film to a preform. The cold parison process is a process of obtaining a blow-molded bottle by reheating mainly the barrel wall portion of the preform obtained by injection molding, stretching the preform in the axial direction using a stretching rod in a blow mold at the glass transition temperature or more of the thermoplastic resin composition constituting the preform and the melting point or less thereof, and blowing a gas into the inner part of the preform to stretch the preform in the diameter direction.

In the method according to the present invention, since the energy curable resin is formed as a film, the resin causes no apparatus contamination due to attachment of the resin to a stretching rod and a preform holding member in blow molding. Further, the thickness of the film on the inner surface of the preform needs to be formed thick in order to expand the preform to be molded into a bottle, so conventional films show the phenomenon of enhanced thickness unevenness due to the dripping of the solution. In contrast, in the case of the energy curable film having a glass transition temperature, the thickness unevenness can be maintained at a low level even if the film is increased in thickness, since sufficient solution viscosity can be secured.

According to the method as described above, an energy curable film can be formed, conforming to the blow-molded bottle obtained. The energy curable film can be cured by cutting the blow-molded bottle and irradiating the inner surface of the bottle with energy.

In order to control the shape of the blow-molded bottle using a known method, a step may further be added in which the blow-molded bottle is placed on an electroformed mold, heated to a temperature equal to or higher than the glass transition temperature of the thermoplastic resin composition constituting the blow-molded bottle while applying pressure such as air pressure to the blow-molded bottle, then returned to normal temperature and normal pressure, and taken out.

The electrophotographic endless belt according to the present invention can be obtained by cutting a barrel portion of the blow-molded bottle having an inner-surface layer obtained according to the method as described above to a predetermined width and irradiating the inner surface of the barrel portion with energy.

The thickness of the base layer of the electrophotographic endless belt is generally 10 μm or more and 500 μm or less, particularly 30 µm or more and 150 µm or less. Specific volume intrinsic resistivity of the base layer of the electrophotographic endless belt is $1 \times 10^2$ Ωcm or more and $1 \times 10^{14}$ Ωcm or less, as a standard, when the electrophotographic endless belt is used as an intermediate transfer belt.

The thickness of the inner-surface layer of the electrophotographic endless belt is generally 0.05 µm or more and 10 µm or less, particularly 0.2 µm or more and 5 µm or less. Specific surface intrinsic resistivity of the surface layer of the electrophotographic endless belt is $1 \times 10^2$ Ω/sq or more and $1 \times 10^{14}$ Ω/sq or less, as a standard, when the electrophotographic endless belt is used as an intermediate transfer belt.

An electrophotographic apparatus which is produced at a low cost and can be reduced in size without a current supply member for primary transfer as described in Japanese Patent Application Laid-Open No. 2012-137733 can be provided by setting the surface intrinsic resistivity of the inner-surface layer of the electrophotographic endless belt to $1 \times 10^4$ Ω/sq or more and $1 \times 10^8$ Ω/sq or less and allowing easy passage of electric current in the circumferential direction of a belt.

The hardness of the inner-surface layer of the electrophotographic endless belt can be H or more in pencil hardness in terms of preventing the occurrence of unevenness by foreign matter and blobbing, and the hardness can be 3H or less in terms of suppressing the occurrence of cracks by durable bending fatigue.

Further, the elongation percentage (tensile elongation) of the inner-surface layer of the electrophotographic endless belt can be 3% or more in terms of preventing the occurrence of cracks by durable bending fatigue. Thus, the electrophotographic endless belt according to the present invention prepared by forming an inner-surface layer including a cured film of an energy curable film having a glass transition temperature on the inner circumferential surface side of a base layer has an inner-surface layer having excellent flexibility and can satisfactorily achieve the elongation percentage described above. For this reason, an electrophotographic endless belt excellent in durability can be obtained whose surface layer is hardly peeled from the base layer even when the belt is used stretched between rollers over a long period of time.

<Electrophotographic Apparatus>

The electrophotographic apparatus according to the present invention will be described. FIG. 1 is a sectional view of a full-color electrophotographic apparatus. In FIG. 1, a cylindrical electrophotographic endless belt according to the present invention is used as an intermediate transfer belt 5. An electrophotographic photosensitive member 1 is a rotating drum-type electrophotographic photosensitive member (hereinafter, described as a "photosensitive drum") which is repeatedly used as a first image carrier, and is rotationally driven at a predetermined circumferential speed (process speed) in the arrow direction. The photosensitive drum 1 is uniformly charged to a predetermined polarity and potential by a primary charger 2 in the rotation process. Then, an electrostatic latent image corresponding to a first color component image (for example, yellow color component image) of a target color image is formed by receiving image exposure 3 by an exposure unit.

Note that examples of the exposure unit include a color separation and imaging exposure optical system of a color original image and a scanning exposure system by a laser scanner which outputs a laser beam modulated corresponding to a time-series electric digital pixel signal of image information. Then, the electrostatic latent image is developed with yellow toner Y as a first color by a first developing unit (yellow color developing unit 41). At this time, a second to fourth developing units (a magenta color developing unit 42, a cyan color developing unit 43, and a black color developing unit 44) are all in an OFF operation state and do not act on the photosensitive drum 1, and the yellow toner image of the first color is not affected by the second to fourth developing units.

The electrophotographic belt 5 is rotationally driven in the arrow direction at the same circumferential speed as the photosensitive drum 1. The yellow toner image on the photosensitive drum 1 is transferred (primary transfer) to the outer circumferential surface of the intermediate transfer belt 5 by an electric field formed by a primary transfer bias applied from an opposing roller 6 to the electrophotographic belt 5 when the yellow toner image passes through a nip portion between the photosensitive drum 1 and the intermediate transfer belt 5. The surface of the photosensitive drum 1 which has completed transfer of the yellow toner image of the first color to the electrophotographic belt 5 is cleaned by a cleaning apparatus 13. Similarly, a magenta toner image of a second color, a cyan toner image of a third color, and a black toner image of a fourth color are sequentially superposed on the electrophotographic (intermediate transfer) belt 5 and transferred to thereby form a synthesized color toner image corresponding to the target color image. A secondary transfer roller 7 is journaled corresponding to and parallel with a drive roller 8 and separably disposed on the lower surface part of the electrophotographic belt 5.

In the primary transfer step of the toner image of the first to third color toner images from the photosensitive drum 1 to the electrophotographic belt 5, the secondary transfer roller 7 may be separated from the electrophotographic belt 5. The synthesized color toner image transferred onto the electrophotographic belt 5 is transferred to a transfer material P which is a second image carrier as follows.

First, the secondary transfer roller 7 is brought into contact with the electrophotographic belt 5, and the transfer material P is fed in a predetermined timing from a paper feed roller 11 to a contact nip between the electrophotographic belt 5 and the secondary transfer roller 7 through a transfer material guide 10.

Then, a secondary transfer bias is applied to the secondary transfer roller 7 from a power supply 31. The secondary transfer bias transfers (secondary transfer) the synthesized color toner image from the electrophotographic (intermediate transfer) belt 5 to the transfer material P which is the second image carrier. The transfer material P having received the transfer of the toner image is introduced into a fixing unit 15 and heated for fixation. After the completion of the image transfer to the transfer material P, an intermediate transfer belt cleaning roller 9 of a cleaning apparatus is brought into contact with the electrophotographic belt 5, to which a bias of reverse polarity to the photosensitive drum 1 is applied. Thereby, a charge of reverse polarity to the photosensitive drum 1 is imparted to a toner which has not been transferred to the transfer material P and remains on the electrophotographic belt 5 (transfer residual toner). Reference numeral 33 is a bias power supply. The transfer residual toner is electrostatically transferred to the photosensitive drum 1 at the nip portion with the photosensitive drum 1 and the vicinity thereof to thereby clean the electrophotographic belt 5.

EXAMPLES

Examples and Comparative Examples will be shown below to specifically describe the present invention. Note that, in Examples and Comparative Examples, electrophotographic endless belts among electrophotographic belts were prepared, and analysis and measurement of physical properties used in Examples and Comparative Examples were carried out as follows.

(Measurement Methods and Evaluation Methods of Characteristic Values)

Measurement methods and evaluation methods of characteristic values of electrophotographic endless belts prepared in Examples and Comparative Examples are as follows.

<Glass Transition Temperature of Energy Curable Resin Film>

An energy curable resin solution was applied to a plate glass and then allowed to stand in a drying oven at 70° C. for 10 minutes. Then, the resulting plate glass was taken out, and the energy curable resin film was removed from the plate glass. This resin was cut into a size corresponding to 10 mg. The resin sample was subjected to measurement with a differential scanning calorimeter (DSC, trade name: DSC823, manufactured by Mettler-Toledo International Inc.) at a heating rate of 10° C./min from −30° C. to 200° C. The temperature at the center of an inflection point indicating glass transition on the DSC curve obtained by the measurement was defined as a glass transition temperature. The case where no glass transition temperature was observed on the DSC curve was specified as "None" in Table 8.

<Method for Measuring Thickness of Inner-Surface Layer of Preform>

The thickness of the inner-surface layer of a preform was determined by cutting a thickness cross-section of the preform with an ultrasonic cutter and subtracting the thickness of the preform from the sum of the thicknesses of the preform and the inner-surface layer using a micrometer.

<Method for Measuring Thickness of Inner-Surface Layer of Electrophotographic Endless Belt>

The thickness of the inner-surface layer of an electrophotographic endless belt was calculated by cutting a thickness cross-section of the belt with a microtome or the like and observing the cross-section by a field-emission scanning electron microscope (FE-SEM) (trade name: XL30, manufactured by FEI Technology, Co., Ltd.). The thickness of the inner-surface layer of the endless belt was measured at 3 points arranged at equal distances in the circumferential direction and 2 points arranged at equal distances in the axial direction, that is, 6 points in total, and the average value, the maximum value, and the minimum value were determined.

<Hardness of Inner-surface Layer of Electrophotographic Endless Belt>

The hardness of the inner-surface layer of an electrophotographic endless belt was measured according to the measuring method of pencil hardness described in ISO 15184. The results are indicated as the hardness (6B-HB-6H) of the core of a pencil, in which 6B is the softest, and 6H is the hardest. A pencil hardness of H or more is desirable in terms of preventing the occurrence of streaks in the circumferential direction of a belt.

<Elongation Percentage of Inner-surface Layer of Electrophotographic Endless Belt>

The elongation percentage of the inner-surface layer of an electrophotographic endless belt was measured according to the measuring method of tensile elongation described in ISO 527-2. The belt was cut into 10 mm in width and 50 mm in length, which was subjected to tensile test with a tensile test apparatus (trade name: Instron 5583, manufactured by Instron Corporation) at a distance between chucks of 30 mm and a stretching rate of 1 mm/min. The tensile elongation is desirably 3% or more in terms of preventing the occurrence of a crack or rupture of the inner-surface layer of a belt.

<Inner-surface Intrinsic Resistivity of Electrophotographic Endless Belt ($\rho s$)>

The measurement was carried out according to JIS-K 6911 using a high resistivity meter (trade name: Hiresta UP, MCP-HT450 type, manufactured by Mitsubishi Chemical Analytech Co., Ltd.) as a measuring instrument, in which a probe (trade name: UR-S, manufactured by Mitsubishi Chemical Analytech Co., Ltd.) having an inside diameter of the main electrode of 50 mm, an inside diameter of a guard-ring electrode of 5.9 mm, and an outer diameter of 11.0 mm was used. A voltage of 100V was applied to a belt for 10 seconds, and the surface intrinsic resistivity was measured at 4 points in the circumferential direction on the inner surface of the belt, and the average value thereof was adopted. An electrophotographic apparatus which is produced at a low cost and can be reduced in size without a current supply member for primary transfer as described in Japanese Patent Application Laid-Open No. 2012-137733 can be provided by a belt having a surface intrinsic resistivity of $10^8$ Ω/sq or less because easy passage of electric current is allowed in the circumferential direction of the belt.

<Method 1 for Verifying Durability of Electrophotographic Endless Belt>

An electrophotographic endless belt was installed as an intermediate transfer belt in an intermediate transfer unit of a laser beam printer (trade name: LBP-5200, manufactured by Canon Inc.) having an apparatus structure as illustrated in FIG. 1. After passing 150000 sheets of paper, purple solid images using two colors of cyan and magenta were printed on A4 gloss paper of 155 g/m$^2$ in an environment of a temperature of 23° C. and a humidity of 50% RH. The images were visually observed, and the presence or absence of a streak in the circumferential direction of the belt resulting from the durability of the endless belt was confirmed and evaluated under the following standard. The streaks in the circumferential direction of the belt are probably caused by the occurrence of unevenness on the inner surface of the belt due to foreign matter or dust.

A: The streaks in the circumferential direction of the belt were not observed in the outputted images.

B: The streaks in the circumferential direction of the belt were observed in the outputted images.

<Method 2 for Verifying Durability of Electrophotographic Endless Belt>

An electrophotographic endless belt was installed as an intermediate transfer belt in an intermediate transfer unit of a laser beam printer (trade name: LBP-5200, manufactured by Canon Inc.) having an apparatus structure as illustrated in FIG. 1. After passing 150000 sheets of paper, purple solid images using two colors of cyan and magenta were printed on A4 gloss paper of 155 g/m$^2$ in an environment of a temperature of 23° C. and a humidity of 50% RH. The images were visually observed, and the presence or absence of local density unevenness of the belt or radial streaks or streaks in the axial direction of the belt resulting from the durability of the endless belt was confirmed and evaluated under the following standard. The local density unevenness or radial streaks of the belt and streaks in the axial direction of the belt are probably caused by the occurrence of cracks of the inner surface of the belt.

A: The local density unevenness or radial streaks and streaks in the axial direction of the belt were not observed in the outputted images.

B: The local density unevenness or radial streaks and streaks in the axial direction of the belt were observed in the outputted images.

(Materials of Thermoplastic Resin Composition of Base Layer Used for Examples and Comparative Examples)

The material compounding ratio of the thermoplastic resin composition of a base layer used in Examples and Comparative Examples is shown in Table 1.

TABLE 1

| | Name and characteristics of material | Compounding ratio (part by weight) |
|---|---|---|
| PE | Polyethylene terephthalate (trade name: TR-8550, manufactured by Teijin Chemicals Ltd.) Tm 260° C. Intrinsic viscosity: 0.50 dl/g (temperature: 25° C., 0.5 mass % solution in o-chlorophenol) | 82 |
| PEEA | Polyether ester amide (trade name: IRGASTAT P20 manufactured by Ciba Specialty Chemicals Inc.) Tm 180° C. | 16 |
| Additive 1 | Surfactant Potassium perfluorobutane sulfonate (trade name: KFBS, manufactured by Mitsubishi Materials Corporation) | 2 |
| Additive 2 | Carbon black (trade name: MA-100, manufactured by Mitsubishi Chemical Corporation) | 1 |

Example 1

A compound described in Table 1 was subjected to thermal melting and kneading using a twin-screw extruder (trade name: TEX30α, manufactured by Japan Steel Works, Ltd.) to prepare a thermoplastic resin composition. The thermal melting and kneading temperature was controlled so as to be in the range of 260° C. or more and 280° C. or less, and the thermal melting and kneading time was set at about 3 to 5 minutes. The thermoplastic resin composition obtained was pelletized and dried at a temperature of 140° C. for 6 hours. Then, the dried pelletized thermoplastic resin composition was charged in an injection molding apparatus (trade name: SE180D, manufactured by Sumitomo Heavy Industries, Ltd.). Then, the cylinder temperature was set at 295° C., and the thermoplastic resin composition was injection molded into a mold temperature controlled at 30° C. to prepare a preform. The preform obtained had a test tube shape having an outer diameter of 20 mm, an inner diameter of 18 mm, and a length of 150 mm.

Then, the inner part of the preform was filled with the ultraviolet curable resin solution formulated as shown in Table 2. Subsequently, the resin solution filled in the inner part of the preform was sucked by a pump from a tube arranged at the bottom of the preform at a rate of 5 cm/sec and allowed to adhere to a wall surface of the preform. The preform was allowed to stand in a drying oven at a temperature of 70° C. for 10 minutes in order to volatilize the solvent. Then, the preform was taken out of the drying oven. After the temperature of the preform is decreased to normal temperature, a fragment was cut out from the preform to measure the thickness of the film including the ultraviolet curable resin. The thickness of the film was 2.0 μm.

TABLE 2

| | Name and characteristics of material | Compounding ratio (part by weight) |
|---|---|---|
| Ultraviolet curable resin | "UNIDIC RC29-120" (trade name, manufactured by DIC Corporation) Butyl acetate/ethyl acetate = 4/1 Solid concentration: 50% Viscosity at 25° C.: 8000 (mPa · s) Molecular weight: about 30000 | 25 |
| Conducting agent | "CELNAX" (trade name, manufactured by Nissan Chemical Industries, Ltd.) (isopropyl alcohol sol of zinc antimonate) | 25 |
| Organic solvent | Methyl isobutyl ketone | 49.5 |
| Polymerization initiator | "IRGACURE 184" (trade name, manufactured by BASF A.G.) | 0.5 |

Figure 2:
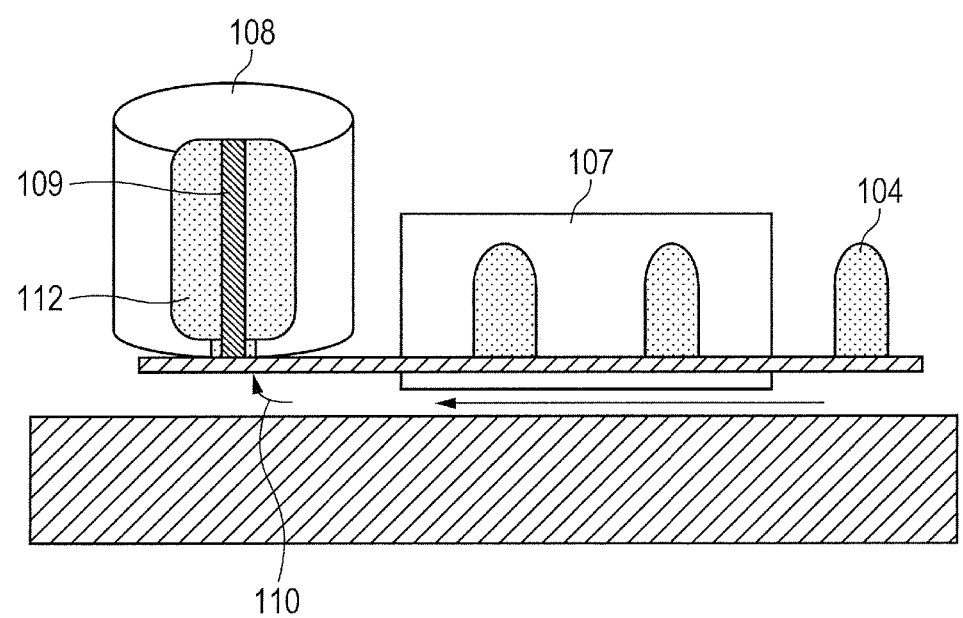
FIG. 2 is a schematic view of a stretch blow molding machine used for the production of an electrophotographic endless belt according to the present invention.

Then, the preform 104 was arranged in a heating apparatus 107 equipped with a non-contact type heater (not illustrated) to heat the outer wall and the inner wall of the preform 104 and heated by the heater so that the temperature of the outer surface of the preform might be 120° C. Then, the preform was biaxially stretched using a biaxial stretch blow molding machine illustrated in FIG. 2. Specifically, the heated preform 104 was arranged in a blow mold 108 kept at a temperature of 30° C. and stretched in the axial direction using a stretching rod 109. Simultaneously, the preform 104 was stretched in the radial direction by introducing air temperature controlled at 23° C. from a blow air injection part 110 into the preform. A biaxially stretched bottle-shaped molded product 112 was thus obtained.

The end of the bottle-shaped molded product 112 was cut, and then the inner surface of the cylindrical molded product was irradiated with ultraviolet rays using an ultraviolet irradiation apparatus (trade name: UE06/81-3, manufactured by Eye Graphics Co., Ltd., cumulative amount of light: 1000 mJ/cm$^2$) to cure the inner-surface layer to obtain a seamless conductive belt. The thickness of the conductive belt was 70 µm. The thickness of the film including the ultraviolet curable resin was 450 nm in average of six points, 520 nm in the maximum value, and 400 nm in the minimum value. The evaluation results of the endless belt are shown in Table 7.

Examples 2 to 4

Electrophotographic endless belts were obtained in the same manner as in Example 1 except that energy curable resin solutions each having a compounding ratio shown in Tables 3 to 5 were used. The endless belts were evaluated in the same manner as in Example 1. The evaluation results are shown in Table 7.

TABLE 3

| | Name and characteristics of material | Compounding ratio (part by weight) |
|---|---|---|
| Ultraviolet curable resin | "UNIDIC RC29-120" (trade name, manufactured by DIC Corporation) Butyl acetate/ethyl acetate = 4/1 Solid concentration: 50% Viscosity at 25° C.: 8000 (mPa · s) Molecular weight: about 30000 | 20 |
| Conducting agent | "CELNAX" (trade name, manufactured by Nissan Chemical Industries, Ltd.) (isopropyl alcohol sol of zinc antimonate) | 50 |
| Organic solvent | Methyl isobutyl ketone | 29.5 |
| Polymerization initiator | "IRGACURE 184" (trade name, manufactured by BASF A.G.) | 0.5 |

TABLE 4

| | Name and characteristics of material | Compounding ratio (part by weight) |
|---|---|---|
| Ultraviolet curable resin | "Acrit 8KX-012C" (trade name, manufactured by Taisei Fine Chemical Co., Ltd.) n-Propyl alcohol/butyl acetate = 1/1 Solid concentration: 39% Viscosity at 25° C.: 65 (mPa · s) Molecular weight: about 25000 | 30 |
| Conducting agent | "CELNAX" (trade name, manufactured by Nissan Chemical Industries, Ltd.) (isopropyl alcohol sol of zinc antimonate) | 25 |
| Organic solvent | Methyl isobutyl ketone | 44.5 |
| Polymerization initiator | "IRGACURE 184" (trade name, manufactured by BASF A.G.) | 0.5 |

TABLE 5

| | Name and characteristics of material | Compounding ratio (part by weight) |
|---|---|---|
| Ultraviolet curable resin | "Acrit 8KX-012C" (trade name, manufactured by Taisei Fine Chemical Co., Ltd.) n-Propyl alcohol/butyl acetate = 1/1 Solid concentration: 39% Viscosity at 25° C.: 65 (mPa · s) Molecular weight: about 25000 | 25 |
| Conducting agent | "CELNAX" (trade name, manufactured by Nissan Chemical Industries, Ltd.) isopropyl alcohol sol of zinc antimonate | 50 |
| Organic solvent | Methyl isobutyl ketone | 24.5 |
| Polymerization initiator | "IRGACURE 184" (trade name, manufactured by BASF A.G.) | 0.5 |

Comparative Example 1

An electrophotographic endless belt having only a base layer was obtained in the same manner as in Example 1 except that no energy curable resin solution was applied to the inner surface of a preform. This endless belt was evaluated in the same manner as in Example 1. The evaluation results are shown in Table 8.

Comparative Example 2

An electrophotographic endless belt was obtained in the same manner as in Example 1 except that a solution having a compounding ratio shown in Table 6 was used as an energy curable resin solution. However, since due to the use of an energy curable resin having no glass transition temperature, a part of the resin adhered to a stretching rod and a preform holding member, the inner surface of the belt was contaminated during the next belt preparation. In addition, the film thickness unevenness of the inner-surface layer of the belt was very large. This endless belt was evaluated in the same manner as in Example 1. The evaluation results are shown in Table 8.

TABLE 6

| | Name and characteristics of material | Compounding ratio (part by weight) |
|---|---|---|
| Ultraviolet curable resin | "OPSTAR KZ-6445" (trade name, manufactured by JSR Corporation) Ultraviolet curable acrylic resin containing dipentaerythritol hexaacrylate Methyl ethyl ketone/methyl isobutyl ketone = 1/1 Solid concentration: 50% Viscosity at 25° C.: 5.0 (mPa · s) Molecular weight: about 1000 | 30 |
| Conducting agent | "CELNAX" (trade name, manufactured by Nissan Chemical Industries, Ltd.) isopropyl alcohol sol of zinc antimonate | 25 |
| Organic solvent | Methyl isobutyl ketone | 44.5 |
| Polymerization initiator | "IRGACURE 184" (trade name, manufactured by BASF A.G.) | 0.5 |

Comparative Example 3

An electrophotographic endless belt was obtained in the same manner as in Example 1 except that a solution having a compounding ratio shown in Table 6 was used as a solution of an energy curable resin having no glass transition temperature, and the resin solution filled in the inner part of a preform was sucked by a pump at a rate of 2 cm/sec. However, since due to the use of an energy curable resin having no glass transition temperature, a part of the resin adhered to a stretching rod and a preform holding member, the inner surface of the belt was contaminated during the next belt preparation. In addition, the film thickness unevenness of the inner-surface layer of the belt was very large. This endless belt was evaluated in the same manner as in Example 1. The evaluation results are shown in Table 8.

Comparative Example 4

The endless belt obtained in Comparative Example 1 was immersed in a metal container filled with the ultraviolet curable resin solution formulated as described in Table 2 and then pulled up at a rate of 5 cm/sec using a portable dip coater (trade name: DT-0001, manufactured by SDI Company, Ltd.) to apply the ultraviolet curable resin solution to the inner surface thereof. The endless belt was allowed to stand in a drying oven at 70° C. for 10 minutes in order to volatilize the solvent, then taken out of the drying oven, and left to be cooled to normal temperature. The inner surface of the endless belt was irradiated with ultraviolet rays using an ultraviolet irradiation apparatus (trade name: UE06/81-3, manufactured by Eye Graphics Co., Ltd., cumulative amount of light: 1000 mJ/cm$^2$) to thereby cure the inner-surface layer. The endless belt was evaluated in the same manner as in Example 1. The evaluation results are shown in Table 8.

Comparative Example 5

While stretching the endless belt obtained in Comparative Example 1 between two rollers and driving one of the rollers at 15 mm/sec, the ultraviolet curable resin solution formulated as described in Table 2 was spray coated at 0.2 cc/sec using a spray gun reciprocally moving at 100 mm/sec in the axial direction of the inner surface of the endless belt. The endless belt was allowed to stand in a drying oven at 70° C. for 10 minutes in order to volatilize the solvent, then taken out of the drying oven, and left to be cooled to normal temperature. The inner surface of the endless belt was irradiated with ultraviolet rays using an ultraviolet irradiation apparatus (trade name: UE06/81-3, manufactured by Eye Graphics Co., Ltd., cumulative amount of light: 1000 mJ/cm$^2$) to thereby cure the inner-surface layer. The endless belt was evaluated in the same manner as in Example 1. The evaluation results are shown in Table 8.

TABLE 7

| | Example | | | |
|---|---|---|---|---|
| | 1 | 2 | 3 | 4 |
| Glass transition temperature of energy beam curable film (° C.) | 55 | 55 | 48 | 48 |
| Inner-surface layer thickness of preform (mm) | 2 | 2 | 1.6 | 1.5 |
| Average inner-surface layer thickness of belt (μm) | 450 | 480 | 400 | 420 |
| Maximum inner-surface layer thickness of belt (I) | 520 | 550 | 450 | 450 |

TABLE 7-continued

|  | Example | | | |
|---|---|---|---|---|
|  | 1 | 2 | 3 | 4 |
| Minimum surface layer thickness of belt (II) (μm) | 400 | 450 | 350 | 340 |
| (I) − (II) (μm) | 110 | 100 | 100 | 110 |
| Hardness of inner-surface layer of belt | 2H | 3H | 2H | 3H |
| Tensile elongation of inner-surface layer of belt (%) | 7 | 5 | 5 | 4 |
| Inner-surface intrinsic resistivity of belt ρ s (Ω/sq) | $5 \times 10^{11}$ | $7 \times 10^{7}$ | $7 \times 10^{11}$ | $9 \times 10^{7}$ |
| Belt durability 1 | A | A | A | A |
| Belt durability 2 | A | A | A | A |

TABLE 8

|  | Comparative Example | | | | |
|---|---|---|---|---|---|
|  | 1 | 2 | 3 | 4 | 5 |
| Glass transition temperature of energy beam curable film(° C.) | — | None | None | 55 | 55 |
| Inner-surface layer thickness of preform (mm) | — | — | — | — | — |
| Average inner-surface layer thickness of belt (μm) | — | 1200 | 750 | 2000 | 1600 |
| Maximum inner-surface layer thickness of belt (I) (μm) | — | 1400 | 1000 | 2500 | 2000 |
| Minimum surface layer thickness of belt (II) (μm) | — | 400 | 250 | 1600 | 1200 |
| (I) − (II) (μm) | — | 1000 | 750 | 900 | 800 |
| Hardness of inner-surface layer of belt | 2B | 4H | 4H | 2H | 2H |
| Tensile elongation of inner-surface layer of belt (%) | — | 1 | 1 | 5 | 6 |
| Inner-surface intrinsic resistivity of belt ρ s (Ω/sq) | — | $6 \times 10^{11}$ | $4 \times 10^{11}$ | $7 \times 10^{11}$ | $4 \times 10^{11}$ |
| Belt durability 1 | B | A | A | B | B |
| Belt durability 2 | B | B | B | A | A |

In the case of the endless belt according to Comparative Example 4, when the belt itself was dip coated, it was difficult to control the film thickness unevenness, particularly at both ends of the belt since the area of the belt was large, and the lower part of the mold tended to be thicker than the upper part thereof. When the pulling-up rate was increased to change the film thickness for reducing the film thickness of the lower part of the mold, it was difficult to control the film thickness unevenness in the circumferential direction due to the influence of the higher pulling-up rate, and the level of the film thickness unevenness of the surface layer of the belt was not satisfactory. In the case of the endless belt according to Comparative Example 5, since coating of the same place twice was inevitable in the process of reciprocation of the spray gun while spray coating, the level of the film thickness unevenness of the surface layer of the belt was not satisfactory.

The surfaces of the endless belts according to Examples 1 to 4 and Comparative Examples 1 to 5 before and after the durability evaluations of the belts were observed by an optical microscope at a magnification of 200 times. The endless belts according to Examples 1 to 4 were significantly improved in the occurrence of streaks in the circumferential direction after the durability evaluation as compared with the endless belts according to Comparative Examples 1, 4, and 5. The local film thickness unevenness of the surface layer may affect the image quality. Further, the endless belts according to Examples 1 to 4 were significantly improved in the local cracks or radial streaks or streaks in the axial direction of the belt after the durability evaluation as compared with the endless belts according to Comparative Examples 1 to 3. The local film thickness unevenness of the surface layer may be deeply related with a phenomenon of poor image quality and affect the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-236650, filed Oct. 26, 2012, which is hereby incorporated by reference herein in its entirety.

REFERENCE SIGNS LIST 1 photosensitive drum
2 primary charger
3 image exposure
5 intermediate transfer belt
6 primary transfer opposing roller
7 secondary transfer roller
8 drive roller
9 intermediate transfer belt cleaning roller
10 transfer material guide
11 paper feed roller 13 cleaning apparatus
15 fixing unit
30, 31, and 33 power supply

What is claimed is:

1. A process for producing an electrophotographic endless belt comprising a base layer comprising a thermoplastic resin composition, and an inner-surface layer, said process comprising the steps of:
    (1) providing a test tube-shaped preform comprising a thermoplastic resin,
    forming an energy curable film having a glass transition temperature on an inner surface of the test tube-shaped preform,
    and then subjecting the test tube-shaped preform to blow molding to obtain a blow-molded bottle;
    (2) irradiating the blow-molded bottle with energy rays to cure the energy curable film to form an inner-surface layer; and
    (3) cutting out an endless belt from the blow-molded bottle having the inner-surface layer obtained in step (2).

2. The process for producing an electrophotographic endless belt according to claim 1, wherein the energy curable film comprises an ultraviolet curable acrylic resin.

3. The process for producing an electrophotographic endless belt according to claim 1, wherein in step (1), said step of forming an energy curable film having a glass transition temperature comprises:
    providing a coating material comprising a solvent, and an energy curable resin having a glass transition temperature dissolved in the solvent;
    forming a film of the coating material on the inner surface of the test tube-shaped preform; and
    volatilizing the solvent from the film of the coating material to form the energy curable film on the inner surface of the test tube-shaped preform.

* * * * *